PANEL CONSTRUCTION FOR RADIO RECEIVER OR THE LIKE

Filed Dec. 28, 1967 2 Sheets-Sheet 1

INVENTOR.
STUART WALTER SIZER

PANEL CONSTRUCTION FOR RADIO RECEIVER OR THE LIKE

Filed Dec. 28, 1967 2 Sheets-Sheet 2

INVENTOR
STUART WALTER SIZER by: Wolfe, Hubbard, Voit & Osann
ATTYS.

# United States Patent Office 3,513,805
Patented May 26, 1970

3,513,805

PANEL CONSTRUCTION FOR RADIO RECEIVER OR THE LIKE

Stuart W. Sizer, Harbert, Mich., assignor to Heath Company, St. Joseph, Mich., a corporation of Delaware
Filed Dec. 28, 1967, Ser. No. 694,348
Int. Cl. H03j *1/04*
U.S. Cl. 116—124.4 4 Claims

ABSTRACT OF THE DISCLOSURE

A front panel construction for a radio receiver having a transparent front portion spaced from a transparent back portion which is coated with an opaque material except for windows thereof which form the indicia which are visible when suitably illuminated by lamps, said front panel giving the illusion of overall blackness with the receiver in an off condition.

It is an object of the present invention to provide a panel construction which is characterized by a rich and handsome appearance whether the receiver is on or off and which appears clear and uncluttered, free of distracting scales and markings, during the time that the receiver is not in use. It is a related object of the invention to provide a panel construction which gives the illusion of overall glassy blackness in the off condition and in which the indicia are invisible even under close scrutiny.

It is another object of the present invention to provide a panel construction in which the tuning and other indicia, upon being illuminated, seem to be suspended behind the front panel, thereby achieving a novel three-dimensional effect.

It is yet another object of the invention to provide a panel construction for a receiver in which the functions of the various controls are clearly indicated during use but which are blacked out at all other times.

Generally, it is an object of the invention to provide a panel construction which implies richness and high cost but which is inherently inexpensive, permitting usage, if desired, even in the low cost receivers in the line.

Other objects and advantages of the invention will become apparent upon reading the attached detailed description and upon reference to the drawings in which.

Figure 1:
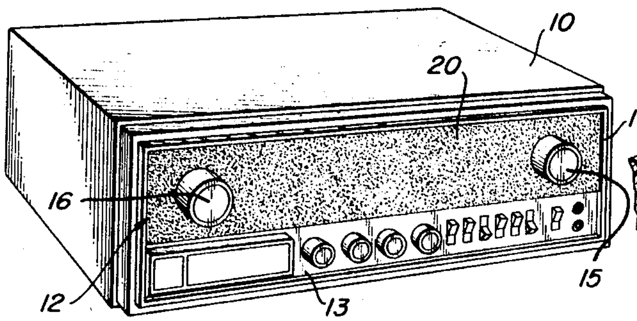
FIG. 1 is a perspective view of a receiver employing the present invention.
Figure 2:
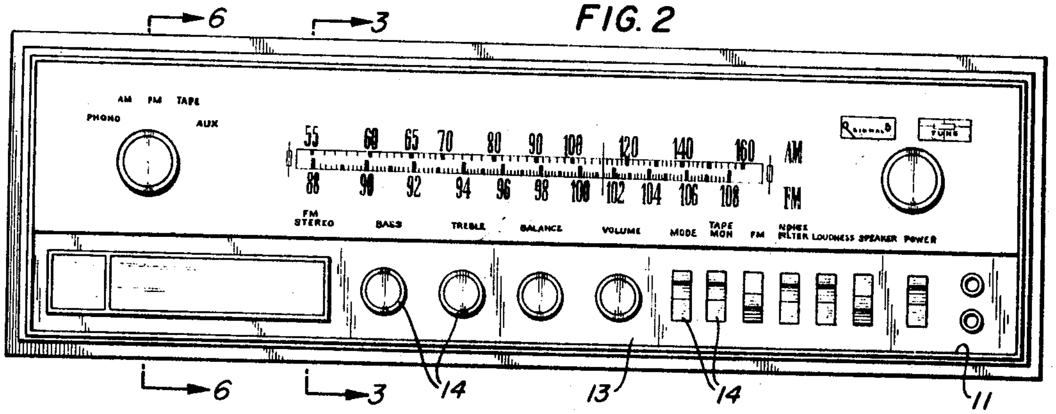
FIG. 2 is a face view of the receiver upon being turned on and with the dial illuminated.
Figure 3:
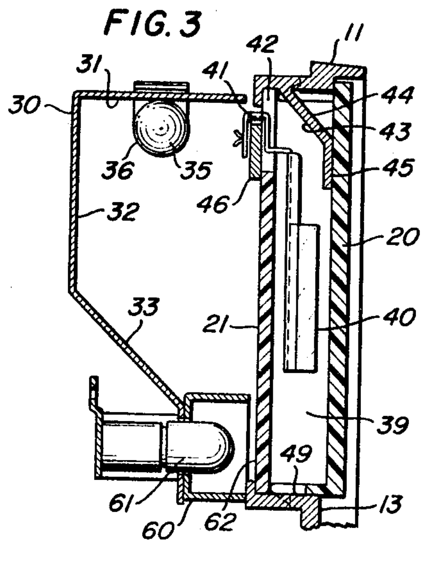
FIG. 3 is a transverse section taken along the line 3—3 in FIG. 2.

Turning now to the drawings, and particularly to FIGS. 1–3 there is disclosed a receiver 10 having a rectangular housing at the front of which is a rectangular frame member 11 which may for example be in the form of a die casting having an extensive opening or area 12 and a lower panel portion 13. The panel portion supports a row 14 of control knobs and switches. Mounted at the ends of the area 12 are knobs 15, 16 which respectively control the tuning of the set and select the mode in which the set is to be operated. When the set is turned off no dial markings or other indicia are visible over the entire area.

In accordance with the present invention a transparent front panel is provided together with a transparent back panel spaced parallel thereto, the back panel having a coating of opaque, light-absorbent material with indicia in the form of windows illuminated by a lamp box, the front panel being sufficiently smoked to provide the illusion of overall blackness when the receiver is off and the lamp box is dark. Thus, turning to the drawings a front panel 20 of transparent but "smoked" material, for example, transparent plastic having a bronze-gray hue, is mounted in the frame 11. Spaced parallel to the front panel is a second transparent panel 21 which is coated on the back, as indicated at 22, with an opaque light-absorbing coating, for example, a layer of black paint which covers the back panel overall except for windows 23 which form the indicia when suitably illuminated. The coating, with its window indicia, is preferably applied by reverse silk screening. For the purpose of coloring the windows 23 a layer of translucent dye material 24 is applied over the area occupied by the indicia. Alternatively, where only one color is required for all of the indicia, the rear panel may be made of tinted plastic, however, clear plastic is preferred for reasons which will become apparent.

For illuminating the window indicia a lamp box 30 is provided behind the rear panel 21 in the form of a laterally extending metal trough or box 30 having a top surface 31, a back surface 32 and an angled bottom surface 33. Spaced along the top surface 31 are a series of lamps 35, which may be conventional dial lamps, fitted in suitable sockets 36. When the lamps are turned off the lamp box 30, and the surrounding housing structure, serve to prevent entry of any unwanted light behind the rear panel 21. The darkened indicia, combined with the effect of the smoked front panel 20 which may have a light transmission coefficient on the order of 60%, removes any distinction between the indicia and the background on the rear panel so that the illusion is one of complete glossy blackness over the entire area of the opening 12. Even rather careful inspection of the front panel when the receiver is turned off fails to give any indication of the indicia on the rear panel.

Figure 5:
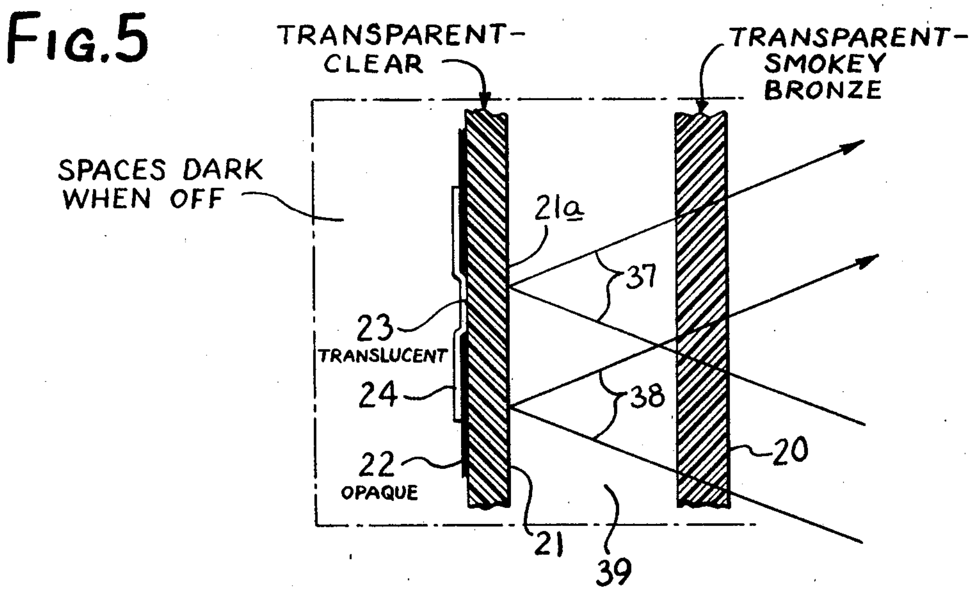
FIG. 5 is a fragmentary section taken through the two panels and showing the opaque coating on the rear panel defining the window indicia.

The illusion of uninterrupted blackness is believed to be due, in part, to the fact that the front surface 21*a* of the rear panel 21, being smoothly continuous and free of any applied layer of paint or the like, has reflection characteristics which are constant over the entire area. Even if the observer makes an effort to see what is behind the front panel 20, the view which he receives along the reflective path 37 (see FIG. 5) at a point on the indicia is the result of spectral reflection and is the same as the view received along the reflective path 38 at a point corresponding to the black background. If it is desired to still further insure that the indicia are hidden when the lamps are turned off, the front panel 20 and the layer 24 of dyed translucent material may be chosen so as to be generally complementary in color. For example, where the front panel 20 has a "bronze" tint, the dyed layer 24 may preferably be green. Any incident light penetrating the front panel is filtered twice, once upon going in, again upon coming out. Thus any residual greenish reflection from the indicia tends to be filtered out as the reflected ray passes, to the eye of the viewer, through the front panel.

By contrast when the lamps 35 are lit the indicia are evenly illuminated at a high level by reason of the multiple reflections occurring in the lamp box, so that the clearly indicia show through the front panel 20 notwithstanding the fact that it is smoked to inhibit light passage. In order to raise the level of illumination within the lamp box 30 to the desired level, a number of dial lamps, for example six, are distributed along the upper edge of the lamp box, and the interior of the box is painted with a flat white paint chosen for its efficient light-reflecting characteristic.

The effect of illuminating the indicia is somewhat startling since the eye tends to focus upon the front panel 20 when the panel is dark. When the lamps are turned on, the indicia jump to life and appear to be suspended in a plane which is spaced behind the front panel thereby providing an illusion of depth.

Figure 4:
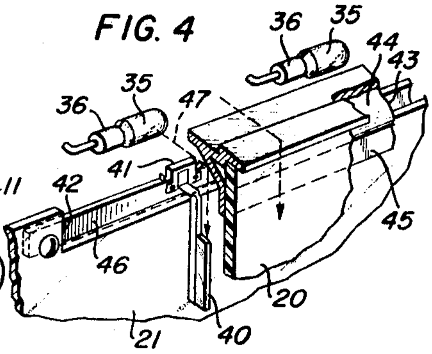
FIG. 4 is a fragmentary perspective showing the mounting and illumination of the dial pointer.

It is one of the more detailed features of the present invention that a vertically arranged pointer is provided in the space 39 for cooperating with the dial indicia with means for illuminating the pointer, when the receiver is turned on, by light cast parallel to the panel 21 which carries the indicia. Thus, referring to FIGS. 3 and 4, a pointer 40 is provided mounted upon a runner 41. The latter is positioned by a suitable, and conventional, dial cable (not shown) which is strung behind the rear panel 21. For the purpose of illuminating the pointer 40 a slot 42 is provided in the upper edge of the panel 21 for transmission of light forwardly from the lamp box, and a laterally extending reflector 43 is used overlying the obscuring slot 42 for directing the light downwardly parallel to the surface of the panel 21. Preferably, the reflector has an angled portion 44 extending forwardly and downwardly at an angle of about 45° as well as a vertical or skirt portion 45. To insure a high reflective efficiency, the inner surface of the angled portion 44 is preferably buffed to a polish. For the purpose of making the reflector 43 substantially invisible through the front panel 20, its outer surface is preferably painted a dead black. For convenience the reflector may be formed integrally with the frame member 11. To insure that the runner 41 is guided smoothly, free of wear, a longitudinally extending rail 46 in the form of a strip of metal is preferably mounted along the lower edge of the slot 44.

In order to increase the visibility of the pointer 40 when the illumination strikes it from the top, it is made of a piece of transparent plastic of the type capable of supporting multiple internal reflections so that the light entering at the upper end is transmitted forwardly. Preferably also the pointer is distinctively colored a fluorescent red to contrast with the dial indicia. Because the light source is distributed and because of the specular reflection which occurs at the reflecting surface, directing light along the path 47, a level of pointer illumination can be established which balances well with that at the indicia. The surface 49 (see FIG. 3) at the foot of the panel 21 is preferably painted a dead black so as to absorb substantially all of the reflected light not striking the pointer. The net result is that both the indicia on the panel 21 and the pointer appear to be "floating" deep in a black environment.

In accordance with one of the further detailed features of the present invention a selector control is provided having clear indicia arranged on the rear panel 21 in a circular locus, and the dyed layer, instead of being applied directly to the windows forming the indicia, is in the form of a rotatable disc of colored light-transmitting plastic located immediately behind the back panel, the disc having a sector with distinctive light-transmitting characteristics so that a selected one of the indicia shows up differently from the remaining ones. Preferably the distinctive sector is in the form of a cut-out so that the selected one of the indicia shows up more brightly than the remainder.

Figure 6:
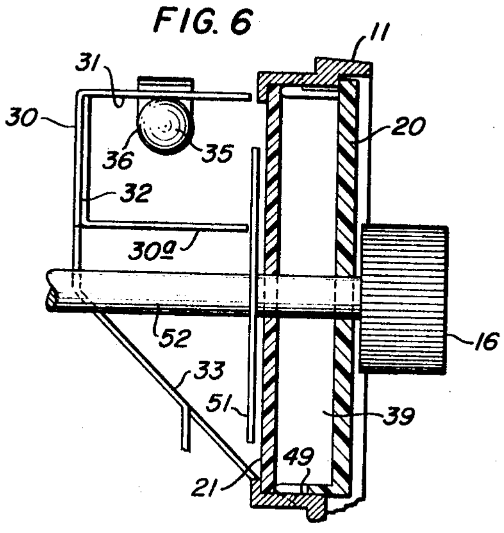
FIG. 6 is a section looking along the line 6—6 in FIG. 2 and showing the selector disc.
Figure 7:
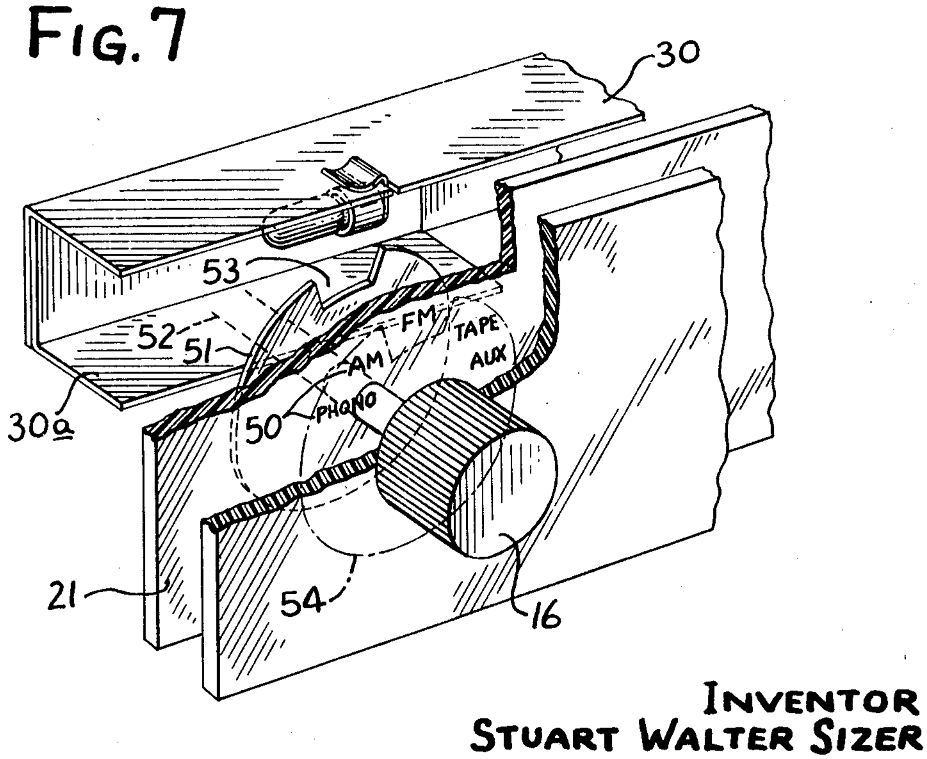
FIG. 7 is a fragmentary and exploded perspective showing the operation of the selector disc.

Thus, referring to FIGS. 6 and 7, the indicia 50 are in the form of clear windows in the opaque coating 22. For coloring the indicia, there is arranged immediately behind the rear panel 21 a disc 51 of colored translucent plastic mounted upon the same shaft 52 which mounts the knob 16. The disc has a cut-out sector as indicated at 53. When the knob 16 is set for operation of the receiver in the FM mode, the cut-out sector 53 frames the index "FM" as indicated by the dot-dash profile 54 (FIG. 7). Under such conditions the light passing through the index "FM" is white, directly from the lamp box and at a high level, whereas the remaining indicia are colored and considerably less bright. Thus when the receiver is turned on the user may note at a glance not only the mode for which the control knob 16 is currently set but all of the options which are available for selection. A switch (not shown) for establishing the mode is mounted at the rear or inner end of the shaft 52 and preferably includes a detent so that the knob 16 snaps successively into its selectable positions.

In order to increase the light level behind the indicia 50, a smaller, auxiliary light reflecting lamp box 30*a* is mounted within the lamp box 30.

Moreover, in practicing the invention a second auxiliary lamp box 60 (FIG. 3) is preferably used having a bulb 61 to illuminate an individual area 62 having window indicia on the panel 21. Such indicia may be dyed a contrasting color and the lamp which illuminates them may be separately switched if desired, for example, to indicate that a stereo signal is being received as covered in copending application Ser. No. 692,536 filed Dec. 21, 1967, FM Stereo Receiver Having Automatic Threshold Switching Circuitry.

The panel assembly described above is distinguished by its appearance in both the off and on conditions. In the off condition the extensive front panel 20 in spite of the fact that it is only moderately smoked shows up as glossy black, clean and uncluttered, providing an interesting foil for a housing having a grained wood finish. When the receiver is turned on the indicia jump to life, seemingly from out of a void, adding novelty to utilitarian function. The effect is achieved at only minor expense so that the present panel construction may be employed even in an inexpensive receiver.

In the following claims the term "extending substantially the width of the housing" has to do with the fact that the front panel preferably occupies an appreciable portion of the width of the receiver housing. The term "lamp box" covers any means defining a space in which the lamps are mounted and which additionally serves to prevent unwanted access of light behind the rear panel when the receiver is off. The term "smoked" as applied to the front panel has to do with the fact that while the front panel can transmit specular light it suffers a drop of intensity during the course of transmission, with coloraation either neutral or tinted. Also while the term "lamps" is used, it will be apparent that the series of lamps may be replaced, if desired, by a single longitudinal lamp extending within the lamp box.

I claim as my invention:

1. In a panel construction for a receiver or the like the combination comprising:

a rectangular housing;

a transparent front panel extending substantially the width of said housing;

a transparent back panel substantially coextensive with the front panel and spaced parallel thereto to define an enclosed rectangular space between said panels;

an opaque light absorbent coating on the back side of said back panel and having indicia in the form of windows in the coating;

means providing a translucent coloring to said back panel windows; and means including a lamp box mounted behind said back panel for preventing unwanted access of light thereto, said lamp box having at least one lamp therein for illuminating said windows, said transparent front panel having a smoked appearance such that specular light suffers a drop in intensity during the course of transmission through said front panel so as to provide an illusion of overall blackness on the front panel when the receiver is off and the lamp box is dark but having sufficient transmissibility such that the window indicia on said back panel are clearly visible therethrough when the lamps are lit as when the receiver is in an on condition.

2. The combination as defined in claim 1 wherein said front panel is tinted a color generally complementary to the translucent coloring on said back panel windows so as to effect a double filtering of incident light penetrating the front panel.

3. The combination as defined in claim 1 and further including:

a vertical pointer mounted for lateral movement between said front and back panels and within said rectangular space for indicating a selected window indicia; and means including a reflector extending along the path of movement of said pointer for directing light on to the pointer when said lamp box is illuminated.

4. In a panel construction for a receiver or the like the combination comprising:

a rectangular housing;

a transparent front panel extending substantially the width of said housing;

a transparent back panel substantially coextensive with the front panel and spaced parallel thereto to define an enclosed rectangular space between said panels;

an opaque light absorbent coating on the back side of said back panel and having indicia in the form of windows in the coating;

means providing a translucent coloring to said back panel windows;

means including a lamp box mounted behind said back panel for preventing unwanted access of light thereto, said lamp box having at least one lamp therein for illuminating said windows;

said transparent front panel having a smoked appearance such that specular light suffers a drop in intensity during the course of transmission through said front panel so as to provide an illusion of overall blackness on the front panel when the receiver is off and the lamp box is dark by having sufficient transmissibility such that the window indicia on said back panel are clearly visible therethrough when the lamps are lit as when the receiver is in an on condition;

a vertical dial pointer in the space between said panels for cooperating with said indicia;

means defining a slot extending along the upper edge of said back panel for transmitting light forwardly from said lamp box;

means for mounting and moving said pointer to positions between said indicia including a runner slidably mounted with respect to said slot; and a laterally extending reflector spaced forwardly of said slot in the space between said panels for reflecting the light from the slot downwardly on to the pointer in all of its positions when the lamp box is illuminated.

References Cited

UNITED STATES PATENTS

| | | | |
|---|---|---|---|
| 1,108,999 | 9/1914 | Levison | 340—381 |
| 2,522,098 | 9/1950 | Coste | 340—202 |
| 2,663,107 | 12/1953 | Moler et al. | 40—133 X |
| 2,897,344 | 7/1959 | Peterson | 116—124.4 X |
| 2,983,248 | 5/1961 | Stemke | 116—124.4 |
| 3,010,235 | 11/1961 | Roberts et al. | 40—133 X |
| 3,129,421 | 4/1964 | Freedman | 340—378.1 |
| 3,129,691 | 4/1964 | Walker. | |
| 3,169,506 | 2/1965 | Morris | 116—124.4 |
| 3,181,497 | 5/1965 | Tompson | 116—124.4 |
| 3,264,625 | 8/1966 | Bateman | 116—124.4 X |

S. CLEMENT SWISHER, Primary Examiner

D. M. YASICH, Assistant Examiner

U.S. Cl. X.R.

240—2.1